(12) United States Patent  
Bodley

(10) Patent No.: US 7,620,433 B2  
(45) Date of Patent: Nov. 17, 2009

(54) DISPLAY HEADSET

(75) Inventor: Martin R. Bodley, Sudbury, MA (US)

(73) Assignee: GN Netcom, Inc. (DK)

( * ) Notice: Subject to any disclaimer, the term of this patent is extended or adjusted under 35 U.S.C. 154(b) by 176 days.

(21) Appl. No.: 10/346,396

(22) Filed: Jan. 15, 2003

(65) Prior Publication Data

US 2004/0137967 A1  Jul. 15, 2004

(51) Int. Cl.  
*H04M 1/00* (2006.01)

(52) U.S. Cl. .................... 455/575.2; 455/41.1

(58) Field of Classification Search ............. 455/426.1, 455/456, 575.1, 566, 420, 575.2, 41, 424, 455/90.1; 705/3; 341/108; 370/310  
See application file for complete search history.

(56) References Cited

U.S. PATENT DOCUMENTS

| | | | |
|---|---|---|---|
| 5,983,100 A * | 11/1999 | Johansson et al. | 455/426.1 |
| 5,991,637 A | 11/1999 | Mack, II et al. | |
| 6,223,029 B1 * | 4/2001 | Stenman et al. | 455/420 |
| 6,510,325 B1 * | 1/2003 | Mack et al. | 455/575.2 |
| 2001/0049262 A1 * | 12/2001 | Lehtonen | 455/41 |
| 2002/0090099 A1 | 7/2002 | Hwang | |
| 2003/0022701 A1 * | 1/2003 | Gupta | 455/566 |
| 2003/0092384 A1 * | 5/2003 | Ross, III | 455/41 |
| 2003/0100274 A1 * | 5/2003 | Brown | 455/90 |
| 2003/0100315 A1 * | 5/2003 | Rankin | 455/456 |
| 2003/0114153 A1 * | 6/2003 | Shaver et al. | 455/424 |
| 2003/0195775 A1 * | 10/2003 | Hampton et al. | 705/3 |
| 2003/0211871 A1 * | 11/2003 | Nassimi | 455/575.1 |
| 2004/0119619 A1 * | 6/2004 | Lambert | 341/108 |
| 2004/0125758 A1 * | 7/2004 | Hayduk | 370/310 |
| 2004/0198470 A1 * | 10/2004 | Dyer et al. | 455/575.1 |

FOREIGN PATENT DOCUMENTS

| | | |
|---|---|---|
| DE | 101 06 072 A1 | 8/2002 |
| WO | WO 03/056790 A1 | 7/2003 |

* cited by examiner

*Primary Examiner*—Lester Kincaid  
*Assistant Examiner*—Phuoc Doan  
(74) *Attorney, Agent, or Firm*—Vista IP Law Group, LLP

(57) ABSTRACT

A wireless headset with an integral display is provided, the headset capable of communicating via a wireless network to a cellular telephone, cellular telephone adaptor, land-line telephone, land-line telephone adaptor, computer, personal digital assistant, or other device capable of communicating via the wireless network. The wireless headset of the invention includes an input transducer (e.g., a microphone), an output transducer (e.g., a speaker), a wireless networking subsystem and a controller/controller interface. The headset may also include means for attaching the headset to the user in order to allow hands-free operation. The integral display, fabricated using any of a variety of suitable technologies, allows headset and system information to be displayed (e.g., battery levels, signal levels, call status, caller identification, incoming call alert, current time, current date, elapsed use time, etc.). The integral display can also be used to aid headset/system configuration (e.g., headset volume, voice dialing, ring mode, roaming mode, etc.). The integral display can also provide added functionality to the headset (e.g., phone lists, text messages, calendar functions, appointment and/or task lists, etc.).

33 Claims, 3 Drawing Sheets

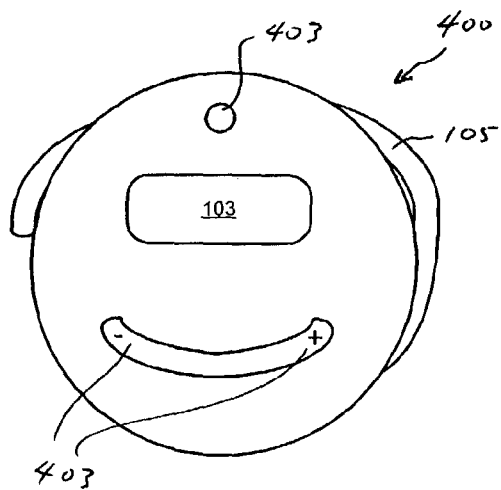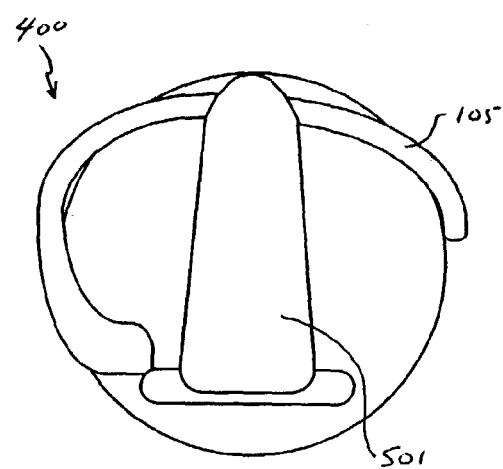
FIG. 4
FIG. 5
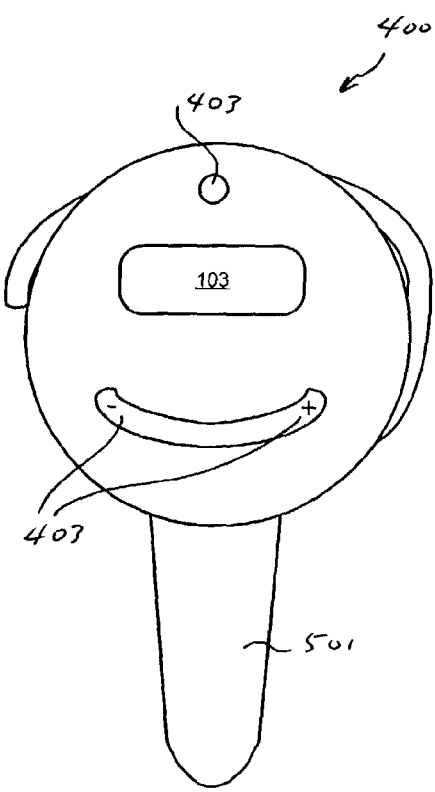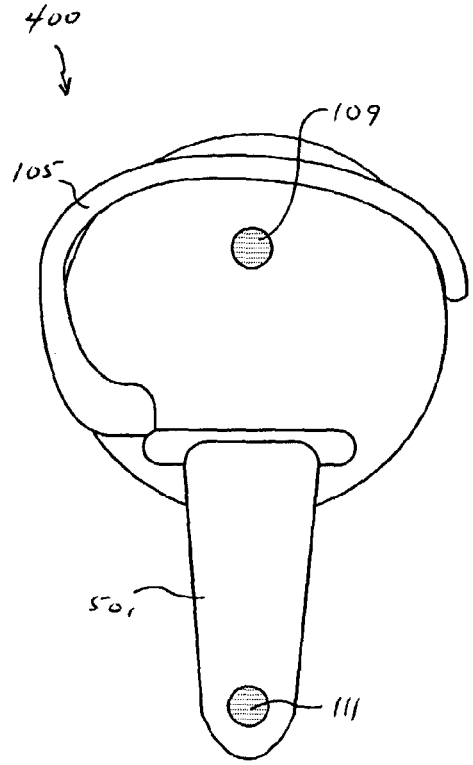
FIG. 6
FIG. 7

DISPLAY HEADSET

BACKGROUND OF THE INVENTION

The need for hands-free communication devices began soon after telephones were first invented. For example, early telephone operators used headsets that included a speaker and a microphone that could be wired or patched into a switchboard, the headset allowing hands-free operation. In the decades that followed, other methods of allowing hands-free operation emerged, ranging from telephone handset cradles that allowed the user to comfortably cradle the handset between the user's head and shoulder, to speaker phones that allowed absolute hands-free operation as long as the user was within the allowable range of the phone's speaker and microphone. More recently, short range wireless telephones have provided people with the freedom to roam 'unconnected' within a limited range of a base unit (e.g., around the home or office) while the advent of cellular telephones and networks have substantially increased this freedom, allowing people to roam untethered over both national and international regions.

While great progress has been made in the development of communication systems, only recently with the advent of Bluetooth and similar open specification technologies have developers been given the freedom to design short range, wireless devices that can connect to a variety of different networks and systems while offering worldwide compatibility. One type of device resulting from the development of these technologies is a wireless headset that can connect to any similarly enabled device or system. When used with a cellular phone that is enabled/adapted for use with one of these technologies (e.g., Bluetooth), the user of such a headset is able to talk freely, unencumbered by wires or cables, while taking advantage of the many benefits of a cellular phone. Unfortunately these headsets tend to be difficult to program and configure and offer the user very limited functionality. Typically the headset is only provided with volume controls, an LED status indicator, and a simple multifunction button that may only allow the user to answer and end a call.

Accordingly, what is needed in the art is a wireless headset with expanded functionality. The present invention provides such a headset.

SUMMARY OF THE INVENTION

The present invention provides a wireless headset with an integral display, the headset capable of communicating via a wireless network to a cellular telephone, cellular telephone adaptor, land-line telephone, land-line telephone adaptor, computer, personal digital assistant, or other device capable of communicating via the wireless network. The wireless headset of the invention includes an input transducer (e.g., a microphone), an output transducer (e.g., a speaker), a wireless networking subsystem and a controller/controller interface. Preferably the headset also includes means for attaching the headset to the user in order to allow hands-free operation. The integral display, fabricated using any of a variety of suitable technologies, allows headset and system information to be displayed (e.g., battery levels, signal levels, call status, caller identification, incoming call alert, current time, current date, elapsed use time, etc.). The integral display can also be used to aid headset/system configuration (e.g., headset volume, voice dialing, ring mode, roaming mode, etc.). The integral display can also provide added functionality to the headset (e.g., phone lists, text messages, calendar functions, appointment and/or task lists, etc.).

A further understanding of the nature and advantages of the present invention may be realized by reference to the remaining portions of the specification and the drawings.

BRIEF DESCRIPTION OF THE DRAWINGS

FIG. 4 is a frontal view of a headset with a foldable boom member and a display in accordance with the invention, the foldable boom member located in the folded position;

FIG. 5 is a back view of the headset shown in FIG. 4;

FIG. 6 is a frontal view of the headset of FIG. 4 with the foldable boom member located in the un-folded position;

FIG. 7 is a back view of the headset shown in FIG. 6;

DESCRIPTION OF THE SPECIFIC EMBODIMENTS

Figure 1:
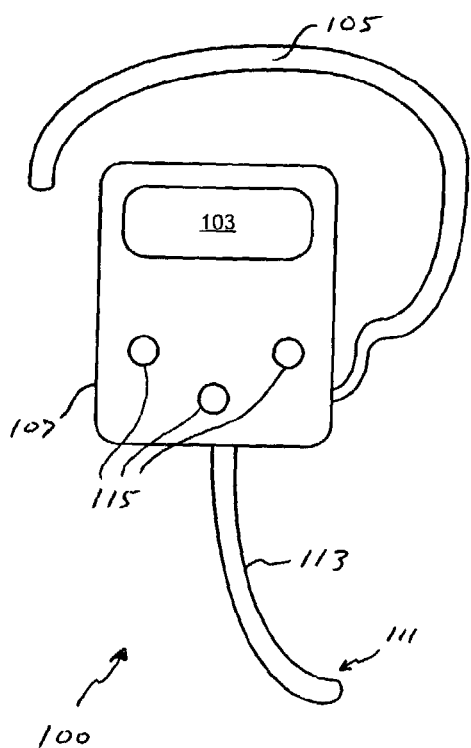
FIG. 1 is a frontal view of a generic headset that includes a display in accordance with the invention.
Figure 2:
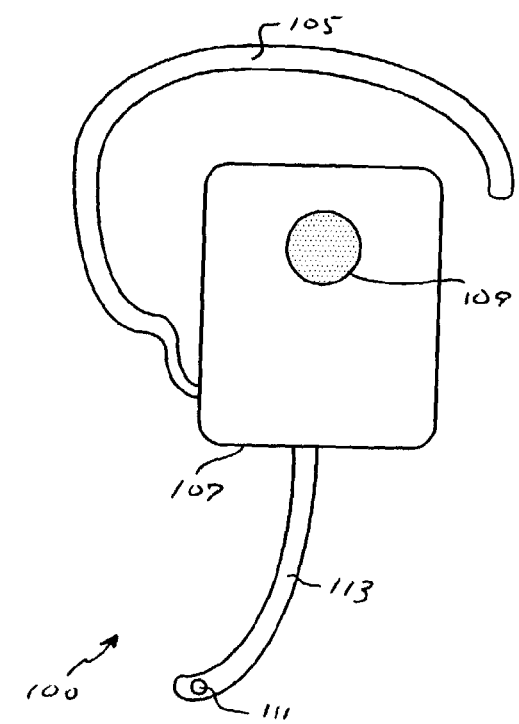
FIG. 2 is a back view of the generic headset shown in FIG. 1.

FIGS. 1 and 2 illustrate the front (FIG. 1) and back (FIG. 2) surfaces of a generic headset 100 that includes the display means 103 of the present invention. Although headset 100 can be used to communicate with any peripheral electronic device in which hands-free operation is desired, preferably headset 100 is used with a device that enables both voice and hearing data transfer (e.g., a computer with voice synthesis and voice recognition capabilities), still more preferably headset 100 is used with a communications system, and still more preferably headset 100 is used with a cellular telephone.

Although headset 100 may use any of a variety of means of attaching to a user (e.g., headband, earpiece, etc.) and thus allowing hands-free operation of the headset, preferably headset 100 includes an earpiece 105 (e.g., an ear hook) that is coupled to the user's ear, or a portion thereof. More preferably, earpiece 105 fits around a portion of the user's ear. Earpiece 105 is coupled to body 107 of the headset, body 107 housing the various electronic components necessary to provide functionality to headset 100. Attached to the back surface of body 107 is an output transducer 109 (e.g., a speaker). Also coupled to body 107 is an input transducer 111 (e.g., a microphone), which, in this embodiment, is located at the end of a boom member 113.

Figure 3:
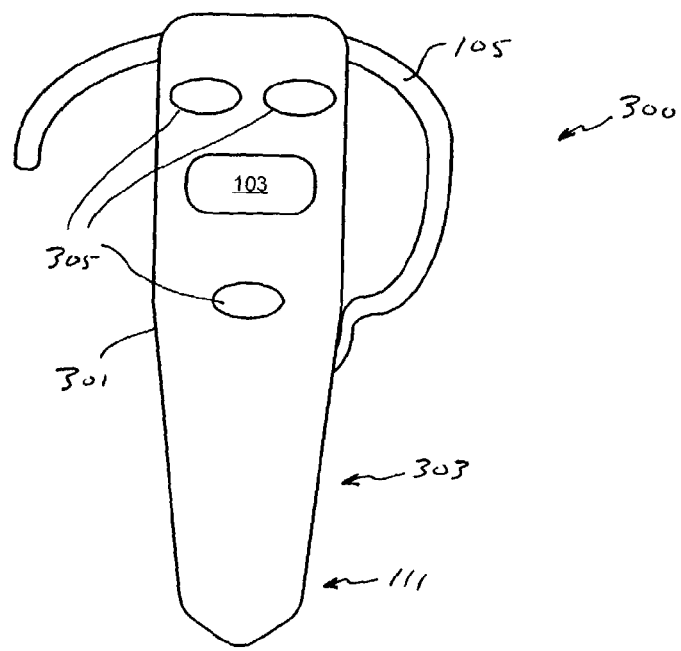
FIG. 3 illustrates a headset with an integral boom member that includes a display in accordance with the invention.

It will be understood that the present invention is not limited to use with a headset of the design shown in FIGS. 1 and 2. For example, it can be used with a headset such as that illustrated in FIG. 3 in which the shape of body portion 301 provides an integral boom 303 to which input transducer 111 is attached (note that input transducer 111 is located on the other side of boom 303 and therefore is not visible in this figure). Alternately, the invention can be used with a headset such as that shown in FIGS. 4-7. FIGS. 4 and 5 show front and back views, respectively, of a headset 400 that includes a folding boom member 501, member 501 shown in its folded position in FIGS. 4 and 5. FIGS. 6 and 7 show front and back views, respectively, of headset 400 with boom member 501 in its unfolded position.

Display 103 can be used to provide the user with various types of information depending upon the design goals for the specific headset. The design goals are primarily based on the expected headset use, desired headset functionality, display size, display resolution, allowable headset power drain, and the processing capabilities of the headset on-board processor (also referred to as a controller or an interface controller). Examples of information that can be displayed on display 103 are headset battery level, headset signal level, call status (e.g., dialing, in use, etc.), caller identification, current time/date, and timer information such as elapsed time associated with a particular call. Display 103 can also be configured to flash or otherwise visually indicate an incoming call. Assuming that the information is provided to the headset processor, display 103 can also display the battery level of the base unit (e.g., cell phone, dongle, etc.) and the signal strength of the base unit (e.g., cell phone). Additionally, display 103 can be used during headset configuration (e.g., to adjust or set the ring mode, ring loudness, headset volume, display mode, voice dialing, time, date, etc.) or to provide additional headset functionality (e.g., phone lists, text messages, dialing using virtual numeric keypad or phone list dialing). Additionally, display 103 can be touch sensitive, thus providing a touch screen for data input (e.g., phone numbers into a phone list, dialing using a virtual numeric keypad).

In addition to providing visual feedback to the user for a variety of headset functions as noted above (e.g., incoming calls, time/date/timer information, caller ID, battery and signal strength, etc.), display 103 can dramatically simplify the process of configuring or otherwise modifying the functionality of the headset. As opposed to the user (or technician) relying on an instruction manual and either flashes from an on-board light emitting diode (LED) or beeps from an on-board sound processor, the user/technician can be provided with on-board written instructions and textual and/or graphical prompts. Thus, for example, the user or technician can easily navigate through a menu system presented on display 103 simply by using one or more input means (e.g., keys, buttons, switches, etc.) preferably located on the outside of the headset body. Preferably the input means includes at least one function key and a pair of volume keys (e.g., "+" and "−"), thus simplifying menu navigation. Examples of input means include keys/buttons 115 on headset 100, keys/buttons 305 on headset 300 and keys/buttons 403 on headset 400.

Figure 8:
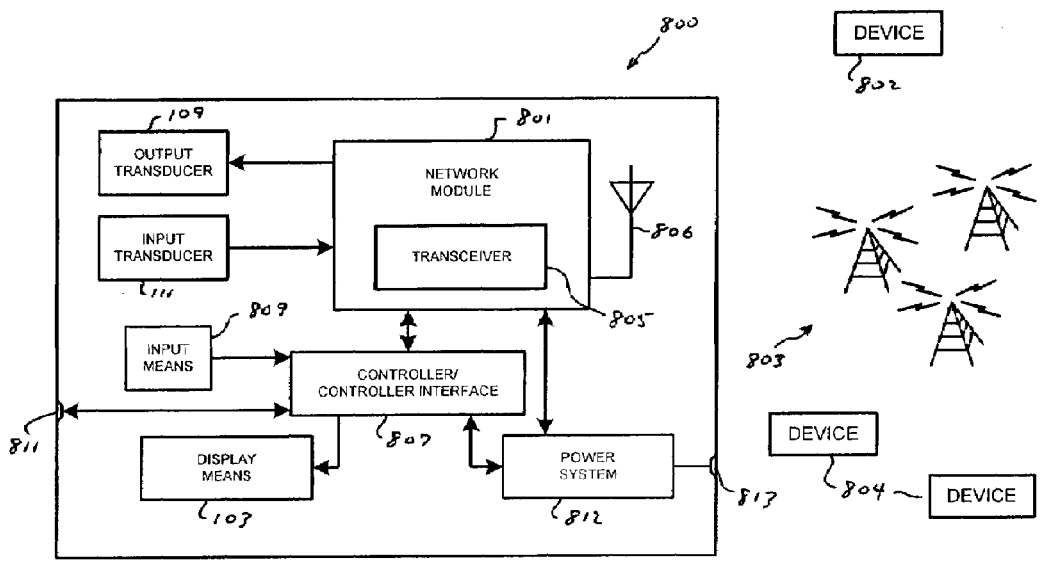
FIG. 8 is a block diagram of the electronics of a preferred embodiment of a headset according to the invention.

FIG. 8 is a high-level block diagram of the electronics of a preferred embodiment of a headset according to the invention. As shown, system 800 includes a wireless networking module 801 that provides short distance (e.g., on the order of 30 feet) wireless communications between the headset (e.g., a headset such as those shown in FIGS. 1-7) and a correspondingly enabled peripheral electronic device 802. Preferably peripheral electronic device 802 is a cellular telephone that communicates data (e.g., voice communications) via a cellular network 803 to other devices 804. As cellular telephones and cellular telephone networks are well know in the art, further description will not be provided herein. Short distance wireless networking module 801 includes a transceiver 805 and can utilize any of a variety of networking technologies and protocols, as long as the selected system provides suitable networking capabilities between system 800 of the headset and device 802. Examples of suitable technologies and standards include Bluetooth and IEEE802.11. As such technologies and standards are well know in the art (see, for example, the specifications found at www.bluetooth.com, www.standards.ieee.org/getieee802/802.11.html and www.grouper.ieee.org/groups/802/11/, all of which are incorporated herein by reference), further description will not be provided herein. Module 801, which is coupled to an appropriate antenna 806, controls the communication of signals between output transducer 109 and input transducer 111 of the headset and device 802.

Although device 802 is preferably a cellular telephone, the present invention can be used equally well with other types of network enabled devices (e.g., cellular telephone adaptors, land-line telephone, land-line telephone adaptor, computers, personal digital assistants or PDAs, etc.).

System 800 includes at least one controller (e.g., processor, microcontroller, application specific integrated circuit or ASIC, etc.) and controller interface (for purposes of illustration, shown as a single module 807). Controller/controller interface 807 may be either within networking module 801, within system 800 but separate from module 801 (as shown), or within both. Controller/controller interface 807 can be used to program and/or modify module 801's programming as well as program and/or modify the functionality of the headset. Preferably one or more keys or switches or other input means 809 are coupled to controller/controller interface 807, thus providing a straightforward means of configuring the system and thus the headset. An interface port 811 (e.g., a serial port or universal serial bus) may also be coupled to controller/controller interface 807, thus allowing the system and/or the graphical user interface (i.e., GUI) presented on display 103 to be configured via an external device such as a computer.

In accordance with the invention, display 103 is coupled to controller/controller interface 807. As such, display 103 can be used in conjunction with input means 809 to configure the headset in general, and module 801 in particular. For example, display 103 can be used to graphically display ring modes, ring volume, headset volume, headset information, signal strength, battery status, charge level, etc. Display 103 can also be used to display information received from device 802, for example caller identification, text messages, calendaring functions, personal phone book information, appointment and/or task lists, etc.

System 800 also includes a power sub-system 812, typically coupled to a charger port 813, power sub-system 812 providing power for the headset electronics.

Figure 9:
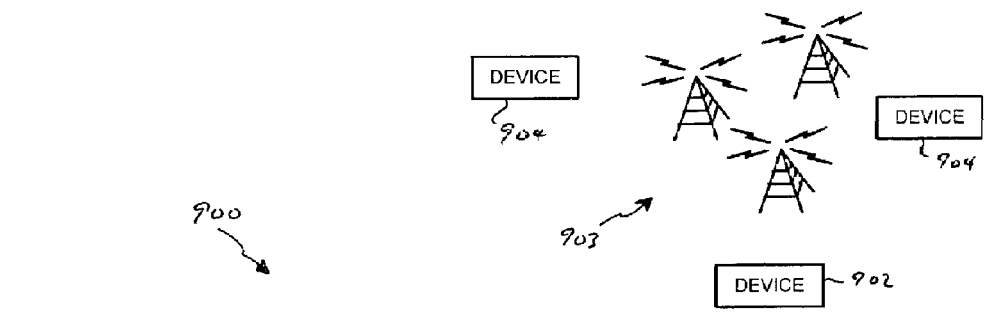
FIG. 9 illustrates the block diagram of the electronics of another preferred embodiment of the invention.

FIG. 9 illustrates the high-level block diagram of the electronics of another preferred embodiment of the invention. As shown, system 900 includes a wireless networking module 901 which utilizes Bluetooth technology to provide communications between the headset and a Bluetooth enabled device 902. Preferably device 902 is a cellular telephone that communicates data (e.g., voice communications) via a cellular network 903 to other devices 904. Module 901 includes a transceiver 905 coupled to an appropriate antenna 907. Module 901 may also include a coder/decoder (i.e., CODEC) 909 for encoding and decoding signals that are to be communicated between output transducer 109 and input transducer 111 of the headset and device 902. Module 901 also includes the various circuits and processors to control transceiver 905 (e.g., link manager 911 which carries control information and baseband processor 913).

In this embodiment, controller/controller interface 807 is located within module 901 and input means 809 is comprised of a pair of volume keys/buttons 915 and a function key/button 917. Volume keys/buttons 915, function key/button 917 and controller/controller interface 807, preferably in combination with display 103, are used to program and/or modify module 901's programming and control the interface of the headset with the network module. Examples of functions that are preferably controlled in this manner include the volume of the received and/or transmitted signals, ring volume, status indicators, headset status, network status, and roaming capabilities. The use of display 103 in conjunction with the input means and the controller interface allow graphical and/or textual display of these functions. For example, bar charts can be used to display network signal strength, headset power, headset volume and ring volume while textual messages are used to communicate ring mode, status, headset information, etc. Additional input means 809, such as a switch 919 coupled to an extendable boom member, can be used in conjunction with controller/controller interface 807 to control headset power. A switch 921, for example coupled to a folding earhook and used in conjunction with controller/controller interface 807, can be used to control the headset status.

As in the previous embodiment, display 103 can also be used to display information either received from device 902 or stored within memory resident within the headset (not shown). Examples of such information include caller ID, text messages, calendars, phone book information, etc.

Display 103 preferably uses liquid crystal display (LCD) technology, although other types of technology can be used. For example, display 103 can use light emitting polymers (LEP), electroluminescent (EL) or active matrix electroluminescent (AMEL) technology, organic thin film transistors (organic TFT), active matrix organic light emitting diodes (AMOLED), amorphous silicon integrated displays (ASID), pliable display technology (PDT) or any other display technology that can provide a suitable resolution in the desired display size.

As will be understood by those familiar with the art, the present invention may be embodied in other specific forms without departing from the spirit or essential characteristics thereof. Accordingly, the disclosures and descriptions herein are intended to be illustrative, but not limiting, of the scope of the invention which is set forth in the following claims.

What is claimed is:

1. A wireless headset, comprising:
a housing;
an input transducer coupled to said housing;
an output transducer coupled to said housing;
a wireless networking module contained within said housing and adapted to transmit first signals via a short distance wireless network to a peripheral electronic device and to receive second signals via said short distance wireless network from said peripheral electronic device, said peripheral electronic device comprising a phone, wherein said first signals are initially received by said input transducer, and wherein said second signals are output by said output transducer after receipt by said wireless networking module;
a display mounted on a surface of said housing and configured to display one or both of status information and configuration feedback information, the status information derived from information transmitted front said peripheral device to said wireless networking module, the status information including one or a combination of a caller identification, a text message, calendar information, phonebook information, appointment information, a task list, a signal level, and a battery level, wherein the configuration feedback information includes one or more of a ring mode, a ring volume, a headset volume, a display mode, voice dialing information, time, date, information for text, and information for configuring a graphic; and
means for attaching said wireless headset to a user.

2. The wireless headset of claim 1, wherein said input transducer is a microphone.

3. The wireless headset of claim 1, wherein said output transducer is a speaker.

4. The wireless headset of claim 1, wherein said wireless networking module is a Bluetooth enabled networking module.

5. The wireless headset of claim 1, wherein said display is capable of indicating an incoming call.

6. The wireless headset of claim 1, wherein said phonebook information comprises a phone list.

7. The wireless headset of claim 1, further comprising at least one controller and a controller interface contained within said housing.

8. The wireless headset of claim 1, further comprising a boom member to which said input transducer is mounted.

9. The wireless headset of claim 8, wherein said boom member is integrated with said housing.

10. The wireless headset of claim 8, wherein said boom member folds relative to said housing.

11. The wireless headset of claim 1, wherein said output transducer is integrated within said housing.

12. The wireless headset of claim 1, wherein said housing contains a battery.

13. The wireless headset of claim 1, wherein said display is adapted to display headset status information.

14. The wireless headset of claim 13, wherein said headset status information includes at least one of headset battery level and headset signal level.

15. The wireless headset of claim 1, wherein said wireless networking module and the peripheral electronic device are configured for use by a user.

16. The wireless headset of claim 1, wherein said peripheral electronic device is capable of being carried by a user.

17. The wireless headset of claim 1, wherein said status information comprises information regarding a call operation.

18. The wireless headset of claim 1, wherein said display is mounted on said surface of said housing such that said display cannot be viewed by a user while the user is wearing said wireless headset.

19. The wireless headset of claim 1. wherein the means for attaching comprises an ear hook.

20. A wireless headset, comprising:
a housing;
a wireless networking module contained within said housing and adapted to transmit first signals via a short distance wireless network to a peripheral electronic device and to receive second signals via said short distance wireless network from said peripheral electronic device, said peripheral electronic device comprising a phone;
a microphone coupled to said housing and coupled to said wireless networking module, wherein said first signals are initially received by said microphone;
a speaker coupled to said housing and coupled to said wireless networking module, wherein said second signals are output by said speaker after receipt by said wireless networking module;
a liquid crystal display coupled to said housing and configured to display one or both of status information and configuration feedback information, the status information derived from information transmitted from said peripheral electronic device to said wireless networking module, the status information including one or a combination of a caller identification, a text message, calendar information, phonebook information, appointment information, a task list, a signal level, and a battery level, wherein the configuration feedback information includes one or more of a ring mode, a ring volume, a headset volume, a display mode, voice dialing information, time, date, information for configuring a text, and information for configuring a graphic; and means for attaching said wireless headset to a user.

21. The wireless headset of claim 20, wherein said display is adapted to display headset status information.

22. The wireless headset of claim 21, wherein said headset status information includes at least one of headset battery level and headset signal level.

23. The wireless headset of claim 20, wherein said wireless networking module and the peripheral electronic device are configured for use by a user.

24. The wireless headset of claim 20, wherein said peripheral electronic device is capable of being carried by a user.

25. The wireless headset of claim 20, wherein said status information comprises information regarding a call operation.

26. The wireless headset of claim 20, wherein said display is mounted on said surface of said housing such that said display cannot be viewed by a user while the user is wearing said wireless headset.

27. The wireless headset of claim 20, wherein the means for attaching comprises an ear hook.

28. A wireless headset, comprising:
- a housing;
- a Bluetooth enabled wireless networking module contained with said housing and adapted to transmit first signals via a short distance wireless network to a Bluetooth enabled cellular telephone and to receive second signals via said short distance wireless network from said Bluetooth enabled cellular telephone one wherein said Bluetooth enabled cellular telephone forwards said first signals via a cellular telephone network and wherein said second signals are transmitted to said Bluetooth enabled cellular telephone via said cellular telephone network;
- a microphone coupled to said housing and coupled to said Bluetooth enabled wireless networking module, wherein said first signals are initially received by said microphone;
- a speaker coupled to said housing and coupled to said Bluetooth enabled wireless networking module, wherein said second signals are output by said speaker after receipt by said Bluetooth enabled wireless networking module;
- a controller and a controller interface contained within said housing and coupled to said Bluetooth enabled wireless networking module;
- a display coupled to said housing and coupled to said controller interface, said display configured to display one or both of status information and configuration feedback information, the status information derived from information transmitted from said cellular telephone to said wireless networking module, the status information including one or a combination of a caller identification, a text message calendar information, phonebook information, appointment information, a task list, a signal level, and a battery level, wherein the configuration feedback information includes one or more of a ring mode, a ring volume, a headset volume, a display mode, voice dialing information, time, date, information for configuring a text, and information for configuring a graphic; and means for attaching said wireless headset to a user.

29. The wireless headset of claim 28, wherein said display is adapted to display headset status information.

30. The wireless headset of claim 29, wherein said headset status information includes at least one of headset battery level and headset signal level.

31. The wireless headset of claim 28, wherein said status information comprises information regarding a call operation.

32. The wireless headset of claim 28, wherein said display is mounted on said surface of said housing such that said display cannot be viewed by a user while the user is wearing said wireless headset.

33. The wireless headset of claim 28, wherein the means for attaching comprises an ear hook.

* * * * *